United States Patent
Bevan et al.

(10) Patent No.: US 9,160,444 B2
(45) Date of Patent: *Oct. 13, 2015

(54) WIRELESS COMMUNICATION

(75) Inventors: David Bevan, Bishops Stortford (GB); Steven Baines, Bishops Stortford (GB)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/857,197

(22) Filed: Aug. 16, 2010

(65) Prior Publication Data
US 2010/0309903 A1 Dec. 9, 2010

Related U.S. Application Data

(63) Continuation of application No. 10/683,300, filed on Oct. 10, 2003, now Pat. No. 7,783,258.

(60) Provisional application No. 60/447,646, filed on Feb. 14, 2003.

(51) Int. Cl.
H04W 56/00 (2009.01)
H04B 7/26 (2006.01)

(52) U.S. Cl.
CPC ........... H04B 7/2678 (2013.01); H04W 56/002 (2013.01)

(58) Field of Classification Search
CPC ..................... H04W 56/002; H04B 7/2678
USPC ............... 455/63.1, 67.11, 67.13, 501, 502
See application file for complete search history.

(56) References Cited

U.S. PATENT DOCUMENTS

| | | | |
|---|---|---|---|
| 6,941,110 B2 * | 9/2005 | Kloper et al. | 455/67.11 |
| 7,079,812 B2 * | 7/2006 | Miller et al. | 455/63.1 |
| 7,164,704 B1 * | 1/2007 | Dabak et al. | 375/133 |
| 2007/0123263 A1 * | 5/2007 | Smith et al. | 455/445 |

* cited by examiner

*Primary Examiner* — Raymond Dean
(74) *Attorney, Agent, or Firm* — Fay Kaplun & Marcin, LLP (57) ABSTRACT

The invention is directed to a method of synchronizing transmission between two nodes in a wireless network. The method comprises the steps of obtaining an expected interference profile for each node; and agreeing a synchronized transmission schedule between the nodes, where the expected interference profile of the or each node meets predetermined criteria.

20 Claims, 6 Drawing Sheets

Fig. 1

PRIOR ART

WIRELESS COMMUNICATION

RELATED APPLICATION

This application is continuation of U.S. patent application Ser. No. 10/683,300, filed Oct. 10, 2003, now U.S. Pat. No. 7,783,258, issued Aug. 24, 2010, which is the full utility filing of U.S. provisional application No. 60/447,646 filed on Feb. 14, 2003, from which the present application claims priority and which is incorporated herein by reference.

CROSS-REFERENCE TO RELATED APPLICATIONS

This patent application is related to the following Provisional patent applications filed in the U.S. Patent and Trademark Office, the disclosures of which are expressly incorporated herein by reference:

- U.S. Patent Application Ser. No. 60/446,617 filed on Feb. 11, 2003 and entitled "System for Coordination of Multi Beam Transit Radio Links for a Distributed Wireless Access System" [15741]
- U.S. Patent Application Ser. No. 60/446,618 filed on Feb. 11, 2003 and entitled "Rendezvous Coordination of Beamed Transit Radio Links for a Distributed Multi-Hop Wireless Access System" [15743]
- U.S. Patent Application Ser. No. 60/446,619 filed on Feb. 12, 2003 and entitled "Distributed Multi-Beam Wireless System Capable of Node Discovery, Rediscovery and Interference Mitigation" [15742]
- U.S. Patent Application Ser. No. 60/447,527 filed on Feb. 14, 2003 and entitled "Cylindrical Multibeam Planar Antenna Structure and Method of Fabrication" [15907]
- U.S. Patent Application Ser. No. 60/447,643 filed on Feb. 14, 2003 and entitled "An Omni-Directional Antenna" [15908]
- U.S. Patent Application Ser. No. 60/447,644 filed on Feb. 14, 2003 and entitled "Antenna Diversity" [15913]
- U.S. Patent Application Ser. No. 60/447,645 filed on Feb. 14, 2003 and entitled "Wireless Antennas, Networks, Methods, Software, and Services" [15912]
- U.S. Patent Application Ser. No. 60/451,897 filed on Mar. 4, 2003 and entitled "Offsetting Patch Antennas on an Omni-Directional Multi-Facetted Array to allow Space for an Interconnection Board" [15958]
- U.S. Patent Application Ser. No. 60/453,011 filed on Mar. 7, 2003 and entitled "Method to Enhance Link Range in a Distributed Multi-hop Wireless Network using Self-Configurable Antenna" [15946]
- U.S. Patent Application Ser. No. 60/453,840 filed on Mar. 11, 2003 and entitled "Operation and Control of a High Gain Phased Array Antenna in a Distributed Wireless Network" [15950]
- U.S. Patent Application Ser. No. 60/454,715 filed on Mar. 15, 2003 and entitled "Directive Antenna System in a Distributed Wireless Network" [15952]
- U.S. Patent Application Ser. No. 60/461,344 filed on Apr. 9, 2003 and entitled "Method of Assessing Indoor-Outdoor Location of Wireless Access Node" [15953]
- U.S. Patent Application Ser. No. 60/461,579 filed on Apr. 9, 2003 and entitled "Minimisation of Radio Resource Usage in Multi-Hop Networks with Multiple Routings" [15930]
- U.S. Patent Application Ser. No. 60/464,844 filed on Apr. 23, 2003 and entitled "Improving IP QoS though Host-Based Constrained Routing in Mobile Environments" [15807]
- U.S. Patent Application Ser. No. 60/467,432 filed on May 2, 2003 and entitled "A Method for Path Discovery and Selection in Ad Hoc Wireless Networks" [15951]
- U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network" [16101]
- U.S. Patent Application Ser. No. 60/480,599 filed on Jun. 20, 2003 and entitled "Channel Selection" [16146]

FIELD OF THE INVENTION

This invention relates to methods and apparatus for wireless communication. The invention relates particularly, although not exclusively, to a wireless relay network.

BACKGROUND TO THE INVENTION

Figure 1:
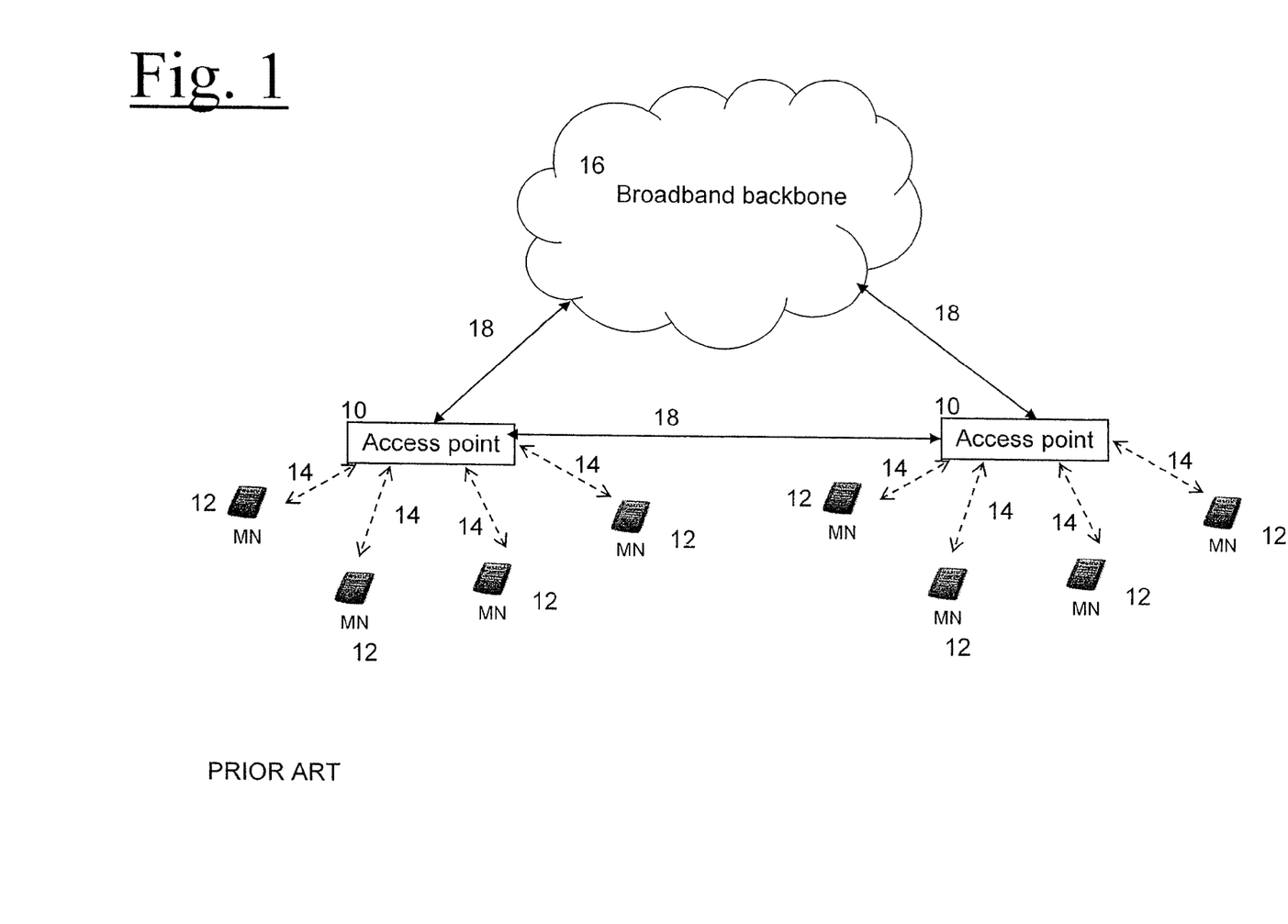
FIG. 1 is a schematic diagram of a Community Area Network (Prior Art)

Wireless Community Area Networks (CANs) have been developed to provide access to the internet for wirelessly-enabled users. A CAN is a network with a size lying between a Wireless Local Area Network (LAN) and a Wide Area Network (WAN). Thus a CAN may provide network access to users distributed over, say, a 1 km$^2$ area, such as a town centre or a university campus. A schematic diagram of a CAN is shown in FIG. 1.

The link 14 from the CAN to the user 12 often uses a cheap and widely-available wireless standard, such as IEEE 802.11 set of protocols, often referred to for simplicity as 'WiFi'.

Current CAN implementations, such as those installed at some US university campuses (for example Carnegie Mellon University), use off-the-shelf WiFi Access Points (APs) 10, connected to each other and to the broadband backbone 16 (and ultimately the internet) across a set of links 18 which is termed a 'Distribution System' (DS). This DS 'backhaul' link usually uses a wired interface, most commonly based on IEEE 802.3 or 'Ethernet'.

A wired DS is desirable from the point of view that it offers a reliable high-bandwidth/low latency path for onward transmission of data. However, the problem with this wired approach is that wires of communications quality need to be provided to each AP, and interconnected via wired switches/hubs/routers etc. In some environments, such as company or university campuses, this wired infrastructure may already be in place. However, in other environments the installation and maintenance of this wired backhaul infrastructure could be prohibitively expensive.

OBJECT TO THE INVENTION

The invention seeks to provide a method and apparatus for wireless communication which mitigates at least one of the problems of known methods.

SUMMARY OF THE INVENTION

According to a first aspect of the invention there is provided a method of synchronising transmission between two nodes in a wireless network, said method comprising the steps of obtaining an expected interference profile for each node; and agreeing a synchronised transmission schedule between the nodes, where the expected interference profile of the or each node meets predetermined criteria.

Preferably, the expected interference profile is obtained by detecting interference received at each node.

The interference profile may be characterised according to transmission parameters, which may include time and frequency.

Each node may comprise a multiple beam antenna, and said transmission parameters may further include the selected beam.

According to a second aspect of the invention there is provided a node in a wireless network comprising: a memory for storing an expected interference profile of the node; a processor for determining where the expected interference profile of the node meets predetermined criteria; and a transceiver for communicating with a second node to agree a synchronised transmission schedule according to the determination of the processor.

According to a third aspect of the invention there is provided wireless network comprising a plurality of nodes as described above.

According to a fourth aspect of the invention there is provided a method of communication between two nodes in a wireless network, said method comprising the steps of: Obtaining an expected interference profile for each node; Agreeing a synchronised transmission schedule between the nodes, where the expected interference profile of the or each node meets predetermined criteria; and Effecting communication in accordance with the synchronised transmission schedule.

According to a fifth aspect of the invention there is provided a signal for agreeing a synchronised transmission schedule between a first and a second node, said signal comprising a reference to a transmission slot, where the expected interference profile at a node meets predetermined criteria.

Advantageously, use of a wireless Distribution System (DS) avoids the high installation and maintenance costs of a wired DS.

Use of synchronised Transit Link Control allows the nodes to schedule their transmissions such that they can avoid interference to and from each other. It enables distant nodes to effectively coordinate their transmissions for the purposes of eliminating mutual interference without needing explicitly to communicate directly with each other.

Additionally, it enables nodes to schedule their transmissions such that they can avoid interference from non-system interferers.

By dividing up the transmission bandwidth into a number of slots according to a selection of transmission parameters, it provides a greater opportunity for nodes to find a transmission slot which is suitable for use.

Utilisation of the multiple degrees of freedom of wireless communication, (e.g. beam, frequency, polarisation, burst time) mitigates interference and maximises system capacity.

Advantageously, this invention enables the sharing of carrier frequencies within a wireless network using unspoken coordination.

Use of directivity within a Transit Node improves reach and minimises interference.

The method may be performed by software in machine readable form on a storage medium.

The preferred features may be combined as appropriate, as would be apparent to a skilled person, and may be combined with any of the aspects of the invention.

BRIEF DESCRIPTION OF THE DRAWINGS

An embodiment of the invention will now be described with reference to the accompanying drawings in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Referring to FIGS. 2-6, there is shown an example of the present invention.

Figure 2:
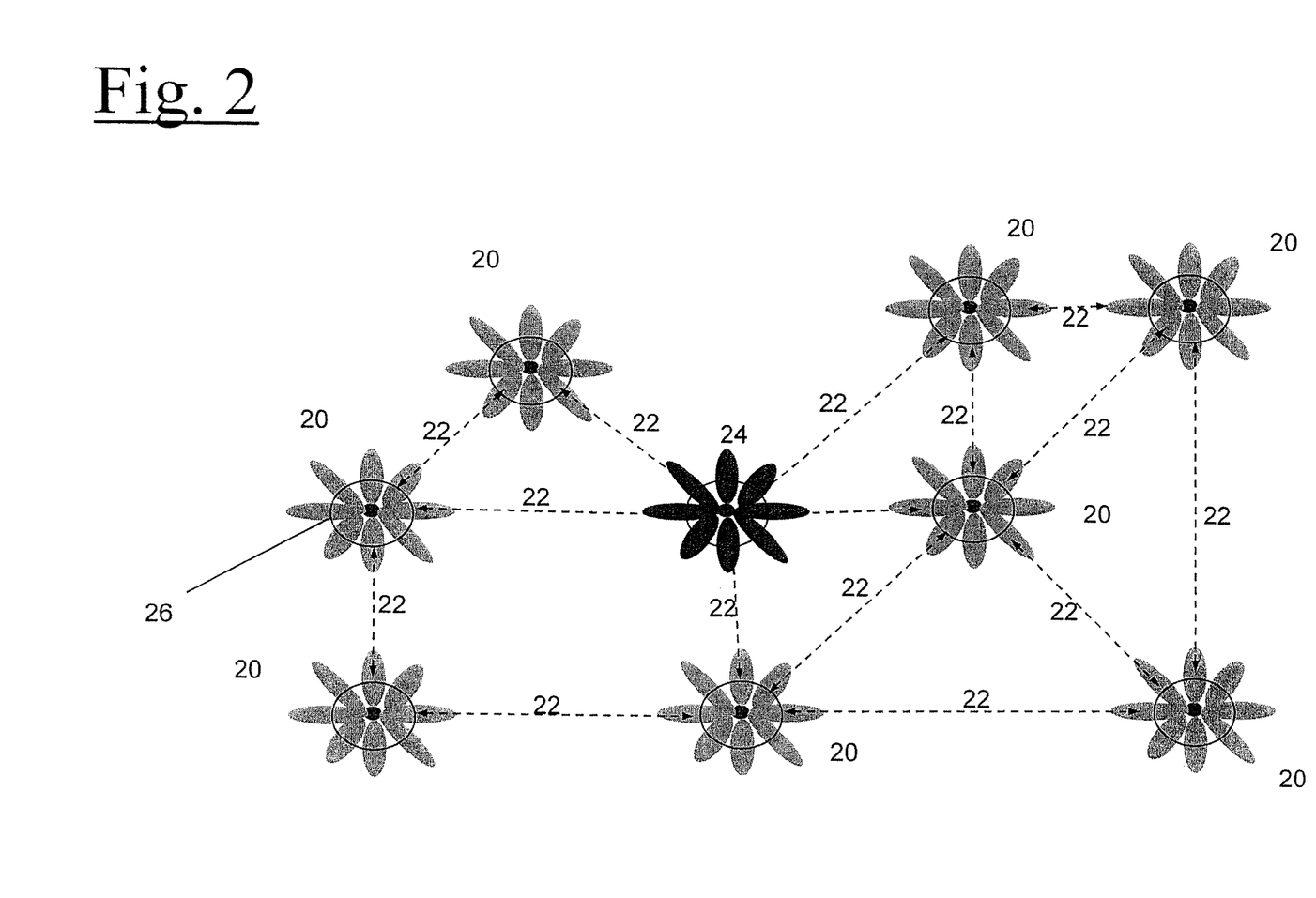
FIG. 2 is a schematic diagram of a Community Area Network according to the present invention.

FIG. 2 shows a schematic diagram of a CAN. The network comprises a number of Wireless Access and Routing Points (WARPs) 20, interconnected by wireless links 22. This CAN therefore uses a wireless 'Distribution System' (DS). The WARPs perform a number of functions, including acting as access points (APs) for connection to mobile nodes (MNs) such as PDAs. The area of coverage of the access link (AL), which is the link from the AP to a MN is shown schematically in FIG. 2 by the circles 26. The WARPs are wirelessly connected to each other and to the Network Access Point (NAP) 24. The WARPs also act as Transit Nodes (TNodes), for wirelessly relaying information between WARPs and also between a WARP and a NAP. The NAP itself connects into a wired/fibre broadband backbone, which in turn is likely to be connected to the internet. A wireless link 22 (also referred to as a backhaul link) from one WARP (or TNode) to another, or between a WARP and a NAP is termed a Transit Link (TL), and the collection of TNodes and Transit Links is referred to as a 'Transit Network' (or TNet). The CAN is used to transmit packets of data and has the ability to forward packets towards their destination by hopping over wireless links through intermediate WARPs (acting as TNodes). FIG. 2 shows a single NAP within the CAN. However, in general there may be more than one NAP within the network.

The CAN shown in FIG. 2 uses wireless technology both for connection to mobile terminals (over the 'Access Link') and for backhaul to a broadband access point (in the wired network).

The CAN shown in FIG. 2 is in a mesh configuration. This is not the only possible configuration. Other configurations, such as a tree structure, may be more suitable for some networks.

Figure 3:
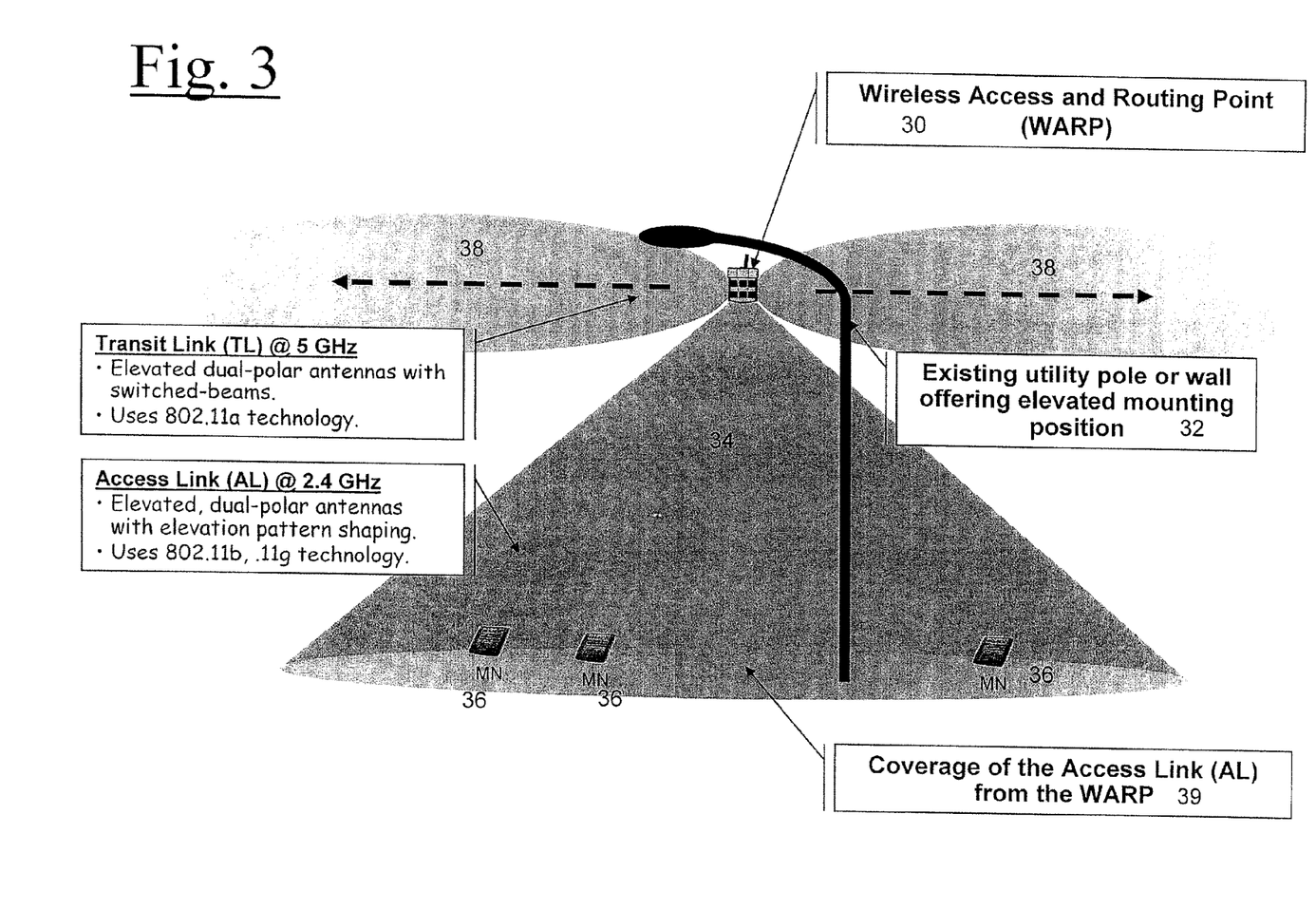
FIG. 3 is a schematic diagram of an installed Wireless Access and Routing Point (WARP) according to the present invention.

FIG. 3 shows a schematic diagram of an installed WARP. The WARP 30 may be fixed to a lamp post, utility pole, wall or other elevated mounting position 32. The WARP provides an Access Link 34 to mobile nodes (MNs) 36 and a Transit Link 38 to other WARPs or to a NAP (as shown in FIG. 1). The Transit Link and the Access Link may use different wireless technologies. For example the Transit Link may use 802.11a technology to provide a 5 GHz link and the Access Link may use 802.11b technology to provide a 2.4 GHz link. The coverage of the two links will not be the same, as shown in FIG. 2, with the Access Link providing local coverage 39 and the Transit Link operating over larger distances so as to communicate with other WARPs or NAPs.

Figure 4:
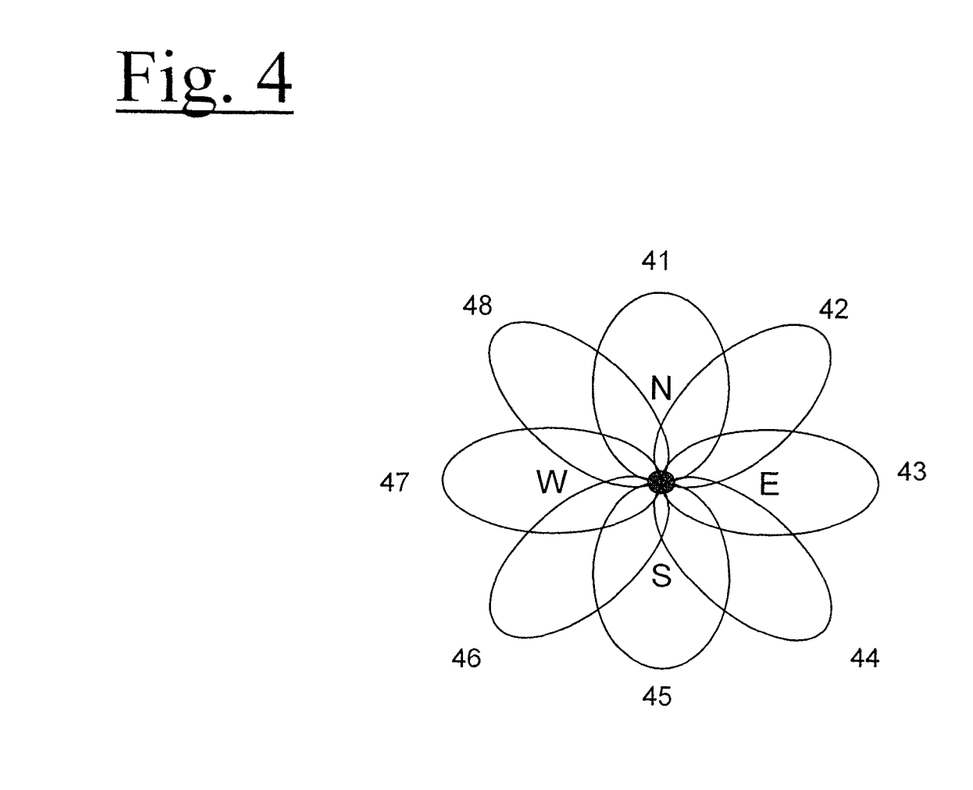
FIG. 4 is a schematic diagram of an example of a beam pattern of a WARP according to the present invention.

In a preferred embodiment, the antenna on the WARP for the Transit Link may be a switched beam antenna and a schematic diagram of such a beam pattern is shown in FIG. 4. The pattern comprises a number of overlapping beams and eight such beams are shown 41-48. The number of beams is not fixed at eight and there may be more beams or fewer beams. The WARP may have only one radio for the Transit Link, which means that it can only transmit on one beam at any one time. This is beneficial as it reduces the cost of the WARP. Other antenna array processing techniques such as transmit diversity and receive diversity may also be beneficial.

In order to operate the Transit Network, a protocol is used which operates at a higher layer than the protocol which is used on the Transit Links (for example 802.11a) and at a lower layer than the routing protocol. This intermediate layer is referred to as the Transit Link Control (TLC) layer. The TLC layer is responsible for scheduling TL transmissions on certain carrier frequencies, beams, time slots etc. This invention relates to a Synchronous Transit Link Control (S-TLC) layer. An alternative technique using an asynchronous approach is described in a co-pending U.S. patent application.

For control purposes and to improve efficiency and accessibility, the transmission bandwidth on the Transit Links is divided up into transmission slots according to various transmission parameters. The transmission parameters may include time, frequency, beam, polarisation and any other suitable independent parameter. By this means the transmission space is divided up into a multi-dimensional array of possible transmission slots. The length of the transmission slots (or time slots) can be chosen according to the network requirements and the accuracy of the clocks used. A long time slot may be beneficial in some cases as it requires a lower accuracy clock within the network nodes and a shorter time slot may be beneficial in some cases as it reduces the delay before a signal can be sent (because the time to the start of the next slot is reduced). The term 'network node' is used to refer to any node within the Transit Network, including but not limited to WARPs and NAPs.

For S-TLC the clocks within the network nodes must be aligned. The clocks may be exactly synchronised, (i.e. slot 1 is the same for all nodes) or alternatively time slot boundaries may be synchronised although not absolute slot numbers (e.g. slot 1 on node 1 may correspond to slot 10 on node 2 but both slots start at the same time).

There are a number of techniques for aligning the clocks within the network nodes and two techniques are described here:

1. Use of GPS (Global Positioning System): By incorporating a GPS receiver into each node, each node will be synchronised to the central GPS clock.

2. Distribution of time stamped packets: Data packets including time stamps are distributed between nodes and each node aligns its clock with any time stamp received from a faster running clock. This may be implemented using the 802.11a Beacon Frame structure which already includes a time stamping function.

Figure 5:
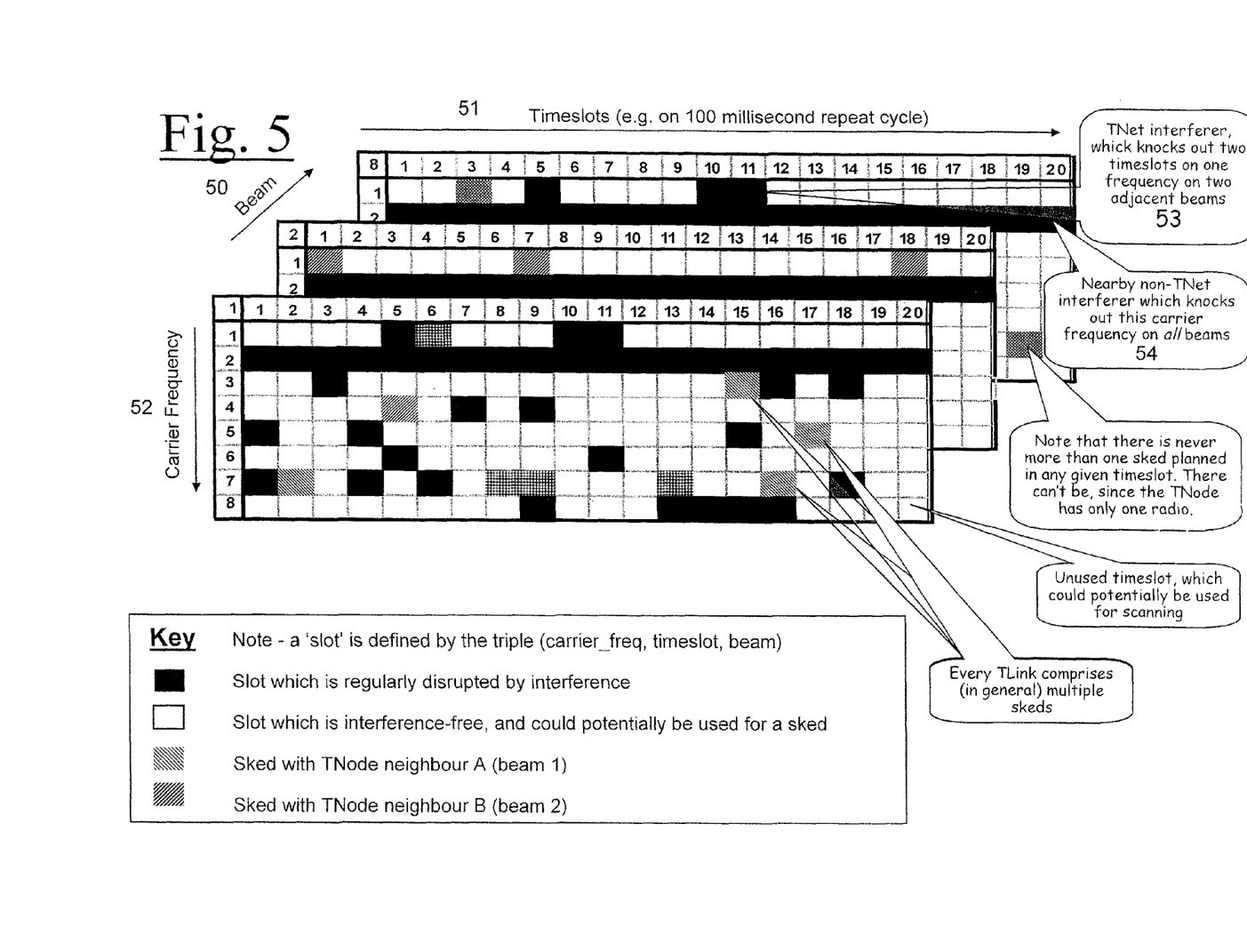
FIG. 5 shows an example of an Interference Table according to the present invention.

A second element of S-TLC is that each node has an Interference Table, as shown in FIG. 5. An interference table is a historical record of which slots within the multi-dimensional array of transmission slots (described above) have tended to suffer from interference. The interference table therefore gives an indication of the expected interference in a given transmission slot. The interference table may be supplied to the node, but preferably the table is independently created and maintained by each node within the network. Methods of measuring interference are well known in the art. The interference table is created and maintained by periodically monitoring the received interference levels and updating the table accordingly.

An example interference table is shown in FIG. 5. It is a three-dimensional array using the following parameters:

Beams, 50: 1-8 (although only data for beams 1, 2 and 8 shown)

Time slots, 51: 1-20

Carrier frequencies, 52: 1-8

These three parameters have been selected by way of example only. Any number of suitable transmission parameters can be used. Suitable parameters include, but are not limited to, beams, time slots, carrier frequencies and polarisation.

In preparing an interference table, a repeat cycle must be selected, (e.g. 100 ms in this case, with this time being divided into 20 slots). This repeat cycle must be the same throughout the network. The table shows the particular time slots on particular frequencies of each beam that should not be used for transmission as historically they have suffered from interference. The interference sources may be transmissions from other nodes within the network (as shown at 53) or sources outside the network (as shown at 54). The non-network interferer, which may be a nearby wireless LAN, may mean that a single frequency cannot be used at all for a particular beam. Preferably the interference table is be compiled from averages of interference received over many repeat cycles. It is anticipated that interference tables will remain the same for periods of tens of minutes or longer.

It should be noted that each node may have a different interference table due to local interference effects. It is not necessary for a node to know the source of the interference it detects and records in its interference table. The node only needs to know that interference is present in order to avoid transmitting in the same slot. The consequences of transmitting in a slot where there is interference include:

i). A packet transmission is deferred (due to sensing of the medium, and backoff, in the underlying Medium Access Control layer)

ii). A packet is lost, because the interference was too high at the receiver iii). The packet was successfully sent, but at a lower data rate than would otherwise have been possible in the absence of the interference All of these three outcomes listed are undesirable and should be avoided if possible. Whilst a Synchronous TLC cannot totally guarantee that interference will be eliminated for each TL packet exchange, it can nevertheless significantly reduce the probability of such interference occurring. It does this by enabling distant TNodes effectively to coordinate their transmissions for the purposes of eliminating mutual interference without needing explicitly to communicate directly with each other for this purpose (the nodes may communicate directly with each other for different purposes, such as authentication and routing).

As each node has its own interference table, it is necessary for adjacent nodes to agree some scheduled slots (referred to herein as 'skeds') for transmission of packet data between them according to when both nodes have suitable slots within their interference tables. A suitable slot is defined as one which meets preset criteria. These criteria will preferably relate to the level of expected interference as determined from the interference table and an acceptable expected interference threshold may be defined. As each node may only have a single radio for transmitting over a Transit Link, it will also be necessary for each node to ensure that they also are capable of transmitting in that slot, (if there is only one radio, the node cannot transmit to more than one node at any one time). The scheduling of initial slots may be established on start up and subsequent slots may be negotiated during already agreed slots.

The scheduling of transmission slots may be for the purpose of setting up a new transmission link or for increasing the bandwidth of an already existing link. Scheduled slots may be agreed by an initiating node signalling to the proposed recipient with a proposal of a slot for a scheduled transmission. The recipient, referring to its own interference table, may refuse the slot or accept the slot. On refusal of the slot the system may be established such that the initiating node or the recipient node proposes a new slot. The process can then be repeated until a mutually convenient slot is found.

A transceiver may be used to communicate to agree the scheduling of slots. The term transceiver is used herein to mean any apparatus capable of transmitting and/or receiving information.

In the situation where clocks are aligned such that their time slot boundaries are coincident but where the time slot numbers are not necessarily identical, it will be necessary for the nodes to confirm their respective slot numbering schemes during the negotiation for a transmission schedule (or skeds).

It is probable that any Transit Link will consist of multiple scheduled transmission slots. In the situation with a multiple beam antenna, these slots are all likely to use the same beam; however they may use different frequencies or other parameters. A node should not set up multiple transmission slots which greatly exceed the amount of data that is likely to require forwarding, because this is likely to cause interference variability to distant nodes. Interference variability may be reduced by filling up unused slots with messaging or dummy data. Nodes should therefore take a long term view when establishing a transmission schedule with another node.

As described above, nodes should preferably monitor received interference levels and update their interference tables accordingly. Additionally, in a preferred embodiment, nodes should also monitor when packets continually failed to be acknowledged during their regular scheduled transmissions (which have already been set up). When this occurs, the problematic scheduled transmission slot should be dropped and a new one established.

FIG. 2 shows a CAN having a mesh structure. This structure is not the only possible structure and one possible alternative is a tree structure. If all or most of the network traffic is expected to pass from the originating WARP, where the data was received via the Access Link from a MN, to the broadband network via the NAP, then a tree structure may be more suitable.

Figure 6:
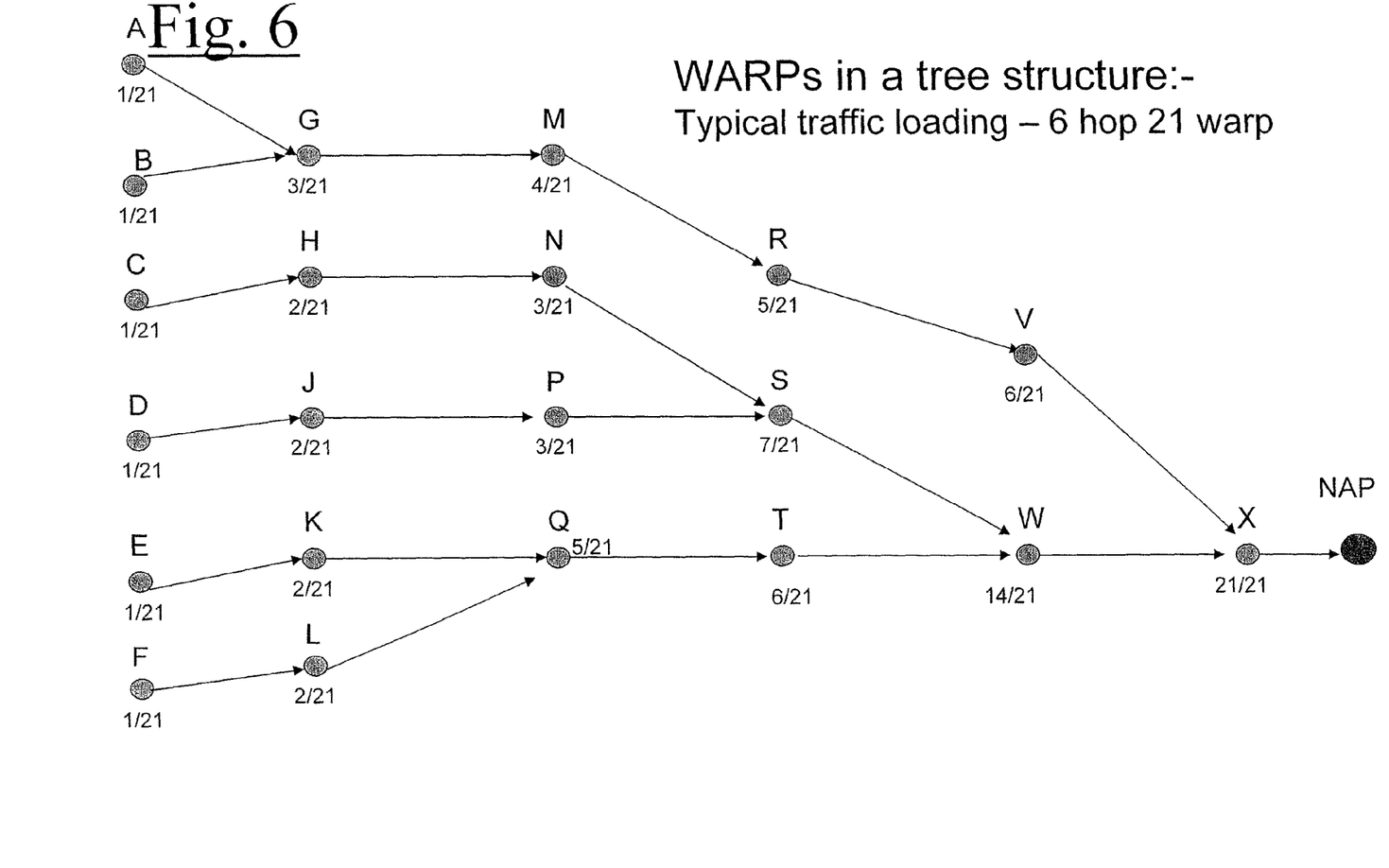
FIG. 6 shows an example of a typical traffic loading for a 6 hop, 21 WARP tree structure network according to the present invention.

FIG. 6 shows a typical traffic loading for a 6 hop, 21 WARP tree structure with traffic flow from the originating WARP to the NAP, via other WARPs as required. The traffic loading at the extremities of the tree structure, WARPs A to F is very low with only 1 in 21 time slots being utilised. Closer to the NAP, the traffic loading increases until at WARP X, all 21 in 21 time slots are utilised. In this network structure a problem may arise in the delay between data arriving at an originating node A-E and being transmitted onwards to the next WARP G-L. If data arrives from a MN via the AL at WARP A in time slot 1, and the next scheduled transmission to WARP G is not until time slot 21, it will be necessary to wait for 20 time slots to pass before the data can pass to WARP G. In order to mitigate this concern, WARP A and WARP G may negotiate two (or more) transmission slots between themselves on the understanding that data is transmitted in any one of these slots. In order that the interference tables throughout the network are not affected by the lack of transmission in the remainder of these slots (this is the effect of interference variability as described above), WARPs A and G may transmit dummy information (plus other signalling information etc) during the slots in which there is no data to send.

Although the above description describes implementation using 802.11 wireless technology, this is not the only suitable technology. Any other wireless technology could be used instead. Use of a widely available wireless standard (such as 802.11) may provide additional benefits from design and manufacturing economies of scale.

It will be understood that the above description of a preferred embodiment is given by way of example only and that various modifications may be made by those skilled in the art without departing from the spirit and scope of the invention.

What is claimed is:

1. A method of synchronizing transmission between two nodes in a wireless network, the method comprising the steps of:
   each node aligning a respective clock with clocks of other nodes of the network;
   obtaining at each node an interference profile based on frequency, wherein the interference profile is compiled from an average of interferences received over multiple repeat cycles; and
   agreeing between the two nodes on a synchronized transmission schedule based on the interference profiles at both nodes such that no frequency is used simultaneously by both nodes.

2. A method as defined in claim 1, wherein the step of each node aligning a respective clock with clocks of other nodes of the network comprises each node aligning time slot edges defined by its respective clock with time slot edges defined by clocks of other nodes of the network.

3. A method as defined in claim 2, wherein the step of each node aligning a respective clock with clocks of other nodes of the network comprises each node further aligning time slot numbers defined by its respective clock with time slot numbers defined by clocks of other nodes of the network.

4. A method as defined in claim 1, wherein the step of obtaining an interference profile comprises measuring interference as a function of frequency at each of the two nodes.

5. A method as defined in claim 4, wherein the step of obtaining an interference profile comprises measuring interference as a function of frequency and time at each of the two nodes.

6. A method as defined in claim 5, wherein the step of obtaining an interference profile comprises measuring interference as a function of frequency and time and at least one other transmission parameter at each of the two nodes.

7. A method as defined in claim 6, wherein the at least one other transmission parameter is selected from the group consisting of polarization and antenna beam.

8. A node for a wireless network, comprising:
   a memory for storing an interference profile based on frequency;
   a transceiver operable to communicate with at least one other node of the wireless network; and
   a processor co-operable with the memory and the transceiver:
   to detect a clock of at least one other node and align a local clock with the detected clock;
   to receive an interference profile from the at least one other node, wherein the interference profile is compiled from an average of interferences received over multiple repeat cycles; and
   to agree on a synchronized transmission schedule with the at least one other node based on the stored interference profile and the received interference profile such that no frequency is used simultaneously by both nodes.

9. A node as defined in claim 8, wherein the processor is operable to align time slot edges defined by the node's clock with time slot edges defined by clocks of other nodes of the network.

10. A node as defined in claim 9, wherein the processor is operable to further align time slot numbers defined by the node's clock with time slot numbers defined by clocks of other nodes of the network.

11. A node as defined in claim 8, wherein the processor is operable to measure interference as a function of frequency.

12. A node as defined in claim 11, wherein the processor is operable to measure interference as a function of frequency and time.

13. A node as defined in claim 12, wherein the processor is operable to measure interference as a function of frequency and time and at least one other transmission parameter at each of the two nodes.

14. A node as defined in claim 13, wherein the at least one other transmission parameter is selected from the group consisting of polarization and antenna beam.

15. A wireless network, comprising at least two nodes, each node comprising:
   a memory for storing an interference profile based on frequency;
   a transceiver operable to communicate with at least one other node of the wireless network; and
   a processor co-operable with the memory and the transceiver:
   to detect a clock of at least one other node and align a local clock with the detected clock;
   to receive an interference profile from the at least one other node, wherein the interference profile is compiled from an average of interferences received over multiple repeat cycles; and
   to agree on a synchronized transmission schedule with the at least one other node based on the stored interference profile and the received interference profile such that no frequency is used simultaneously by both nodes.

16. A wireless network as defined in claim 15, wherein the processor of each node is operable to align time slot edges defined by the node's clock with time slot edges defined by clocks of other nodes of the network.

17. A wireless network as defined in claim 16, wherein the processor of each node is operable to further align time slot numbers defined by the node's clock with time slot numbers defined by clocks of other nodes of the network.

18. A wireless network as defined in claim 17, wherein the processor of each node is operable to measure interference as a function of frequency.

19. A wireless network as defined in claim 18, wherein the processor of each node is operable to measure interference as a function of frequency and time.

20. A wireless network as defined in claim 19, wherein the processor of each node is operable to measure interference as a function of frequency and time and at least one other transmission parameter at each of the two nodes.

* * * * *